(12) United States Patent
Knittel et al.

(10) Patent No.: US 8,694,609 B2
(45) Date of Patent: Apr. 8, 2014

(54) METHOD AND APPARATUS FOR IMPROVING WIRELESS DATA NETWORKS PERFORMANCE

(75) Inventors: Steven F. Knittel, West Allenhurst, NJ (US); Madhav Moganti, Piscataway, NJ (US); Nataraj Rao, Freehold, NJ (US)

(73) Assignee: Alcatel Lucent, Paris (FR)

( * ) Notice: Subject to any disclaimer, the term of this patent is extended or adjusted under 35 U.S.C. 154(b) by 2314 days.

(21) Appl. No.: 10/780,833

(22) Filed: Feb. 18, 2004

(65) Prior Publication Data

US 2005/0182826 A1 Aug. 18, 2005

(51) Int. Cl.
*G06F 15/16* (2006.01)

(52) U.S. Cl.
USPC .......................................................... 709/219

(58) Field of Classification Search
USPC .......................................................... 709/219
See application file for complete search history.

(56) References Cited

U.S. PATENT DOCUMENTS

| | | | | |
|---|---|---|---|---|
| 7,206,777 | B2* | 4/2007 | Pepper et al. | 707/3 |
| 7,216,154 | B1* | 5/2007 | Chow et al. | 709/219 |
| 7,231,357 | B1* | 6/2007 | Shanman et al. | 705/14 |
| 7,870,089 | B1* | 1/2011 | Hall et al. | 707/694 |
| 2002/0065800 | A1* | 5/2002 | Morlitz | 707/1 |
| 2003/0084143 | A1* | 5/2003 | Knoesel et al. | 709/224 |

OTHER PUBLICATIONS

"Transitions or transmissions?" *AV Magazine*, 2001, 11, 46.
Bove, V.M., Jr. et al., "Personal Projectors Based on VCSEL Arrays," *Proceedings of the SPIE—The International Society for Optical Engineering*, Santa Clara, CA, Jan. 22-23, 2003, 5002, 1-6.
Chiu, P. et al., "Meeting Capture in a Media Enriched Conference Room," *Cooperative Buildings: Integrating Information, Organizations and Architecture; Second International Workshop, CoBuild '99; Proceedings*, Pittsburgh, Pennsylvania, Oct. 1-2, 1999, 79-88.
Chiu, P. et al., "NoteLook: Taking Notes in Meetings with Digital Video and Ink," *Proceedings ACM Multimedia*, Orlando, Florida, Oct. 30-Nov. 5, 1999, 149-158.

(Continued)

*Primary Examiner* — Phuoc Nguyen
*Assistant Examiner* — Kishin G Belani
(74) *Attorney, Agent, or Firm* — Wall & Tong, LLP (57) ABSTRACT

A method and apparatus for data communications over a wireless network. A user contacts an Internet gateway over the wireless network. When the user requests an Internet resource it sends an improved HTTP command to the gateway. The improved HTTP command causes the internet gateway to access a resource file and obtain not only the requested resource, but also all of the resources embedded in the requested resource. The requested resource and embedded resources are bundled into a file and sent to the user. By eliminating parsing of the requested resource by the user and subsequent requests for embedded information, the wireless network does not have to make multiple supplemental communication channel assignments, which improves overall performance.

16 Claims, 4 Drawing Sheets

(56) References Cited

OTHER PUBLICATIONS

Fordham, E., "Tele-Presentations," *Business Equipment Digest*, 1994, 41-42 and 44.

Jones, C. et al., "Group Interactive Learning with Group Process Support Technology," *British J. Educational Technology*, 2001, 32(5), 571-586.

Miyamoto, M. et al., "Multicast Protocol for Presentation in Wireless LAN Environment," *Trans. of the Information Processing Society of Japan*, 2001, 42(12), 3093-3101 (English language abstract included).

Takao, N. et al., "Tele-Graffiti: A Camera-Projector Based Remote Sketching System with Hand-Based User Interface and Automatic Session Summarization," *Int'l J. Computer Vision*, 2003, 53(2), 115-133.

Vila, X. et al., "A PDA-Based Interface for a Computer Supported Educational System," *Proceedings $3^{rd}$ IEEE International Conference on Advanced Technologies*, Athens, Greece, Jul. 9-11, 2003, 12-16.

Zhang, J. et al., "Software Solution to Completely Wireless Presentation," *Proceedings International Conference on Parallel Processing Workshops*, Valencia, Spain, Sep. 3-7, 2001, 459-464 (Abstract only).

\* cited by examiner

METHOD AND APPARATUS FOR IMPROVING WIRELESS DATA NETWORKS PERFORMANCE

BACKGROUND OF THE INVENTION

1. Field of the Invention

Embodiments of the present invention relate to wireless communications. More specifically, embodiments of the present invention relate to wireless network Client-Server implementations that provide improved response times.

2. Description of the Related Art

Wireless radio access networks have been using Code Division Multiple Access (CDMA) 3G-1X technology for voice and data communications for some time. CDMA 3G-1X technology provides network voice and data transmission speeds of up to 153.6 kilobits per second. Because of such speeds, CDMA 3G-1X technology has been able to improve mobile services such as wireless Internet access, email, general data, and video services, while providing high quality voice communications.

While CDMA 3G-1X technology is an improvement over prior technologies such as CDMA 2G and CDMA 2.5G, CDMA 3G-1X networks have suffered from various limitations. For example, from a user perspective, internet data round trip delays on CDMA 3G 1X networks are unacceptably high since those round trip delays are not capable of providing internet service comparable to those available with LAN, cable based and dial-up broadband networks.

Another problem with 3G 1X networks is that they do not provide "always-on-connectivity" similar to what cable and DSL networks provide. When an end-user starts data service on a wireless client, the 3G 1X base station assigns a fundamental channel for the data session and assigns a supplementary channel (SCH) based on the amount of data being transferred. The base station relinquishes the assigned SCH once the base station has transferred the data in the buffer. The base station must assign a new SCH for the subsequent data as it arrives. Unfortunately, assigning and relinquishing SCHs is inefficient because assigning an SCH is a time-consuming process that introduces unwanted delays. Current 3G 1X network implementations typically require approximately five 20 millisecond (ms) frames, that is, 100 ms of latency, when assigning an SCH. Such delays can be completely unacceptable if SCHs are assigned and unassigned based on rapidly changing communication requirements.

Unfortunately, assigning and relinquishing SCHs is important to the operation of 3G 1X networks. 3G 1X networks operate on the basic assumption that 3G 1X packet data traffic is bursty, exhibiting brief durations of high traffic separated by much larger durations of no traffic. It would be very inefficient to dedicate a permanent traffic channel to a packet data call. However, if a 3G 1X system is not designed correctly the bursty aspects of 3G 1X data traffic can seriously degrade service quality because of a reduction in available power. Thus, a key 3G 1X network design issue is ensuring that a CDMA channel that carries voice and data calls does so with negligible impact to the service quality of both. Thus, supplemental channels (SCHs) are assigned and unassigned as required.

In view of the need for SCH assignments, and in further view of the delays associated with such assignments, methods, devices, and systems that reduce the required number of SCH assignments would be beneficial.

SUMMARY OF THE INVENTION

Embodiments of the present invention generally provide for methods, devices, and systems that reduce the required number of SCH assignments in CDMA wireless data networks.

Some embodiments of the present invention provide for methods, devices, and systems that reduce the required number of SCH assignments in 3G 1X networks.

Some embodiments of the present invention include a communication network apparatus having a gateway for receiving a request for a resource having embedded data. In response to that request, the gateway obtains the resource and the embedded data, and then bundles the resource and the embedded data into a file. That file can then be sent to a user.

In some embodiments, the gateway will obtain the resource and the embedded data using a resource index file that includes information regarding the resource and the embedded data. That information can include a copy of the resource and/or links to the embedded data. The information can also include the time required to obtain the embedded data.

The principles of the present invention further provide for a method of operating a network gateway. The method includes receiving a request for a resource having embedded data, obtaining information regarding the resource and embedded data from a resource index file, and then obtaining the resource and embedded data using the information obtained from the resource index file. In some embodiments, the network bundles the obtained resource and the obtained embedded data into a response file, and then sends the response file.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

The principles of the present invention provide for improved response times of wireless data networks, such as those used to provide internet communications. Embodiments of the present invention improve web page uploads, and thus provide an improved user experience. For convenience, what follows is based on an extension (improvement) of the HTTP (Hypertext Transfer Protocol) protocol. However, the principles of the present invention can be applied to wireless data networks that use other protocols, such as WTP, WHTTP, etc.

Embodiments of the present invention can achieve improved performance while otherwise adhering to HTTP standards such that changes to existing servers are not required. In operation, an end-user (such as a client using a web browser) sends a single enhanced HTTP request for information on a uniform resource identifier "URI" (primary URI) to an iHTTP gateway server. Contrary to standard HTTP practices, after the end-user sends the initial URI request, the end-user does not send any other, even if the responsive URL page has embedded resources (e.g., images). Rather, the iHTTP gateway parses the responsive uniform resource locator "URL" page to identify the embedded resources, obtains those embedded resources, and then bundles all the responses into a file. That file is then sent to the end-user. This eliminates time-consuming parsing of the initial URI response file by the end-user and subsequent accessing of the embedded resources, which may require numerous SCH assignments.

To create the bundled file, the iHTTP gateway uses pre-compiled resource index files that contain detailed information about the initial URI request and its embedded resources. Additionally, the server efficiently organizes the embedded resources in the bundled file based on the resource's storage location, time required to access it from the location, and other network performance characteristics learned from past accesses of the resources.

The basics of the HTTP protocol may be helpful to understand the subject invention. HTTP, which stands for Hyper-text Transfer Protocol, is the network protocol that is currently used to deliver virtually all files and other data (collectively called resources) on the World Wide Web, whether they're HTML files, image files, query results, or anything else. The following definition may be helpful.

HTTP Client: a web browser.

HTTP Server: a network resource that receives an HTTP Client's requests, obtains responses to those requires, and then sends those responses back to the HTTP Client.

Resources: a chunk of information that can be identified by a URL. The most common kind of resource is a file, but a resource may also be a dynamically generated query result, the output of a program script, a document that is available in several languages, or something else.

Figure 1:
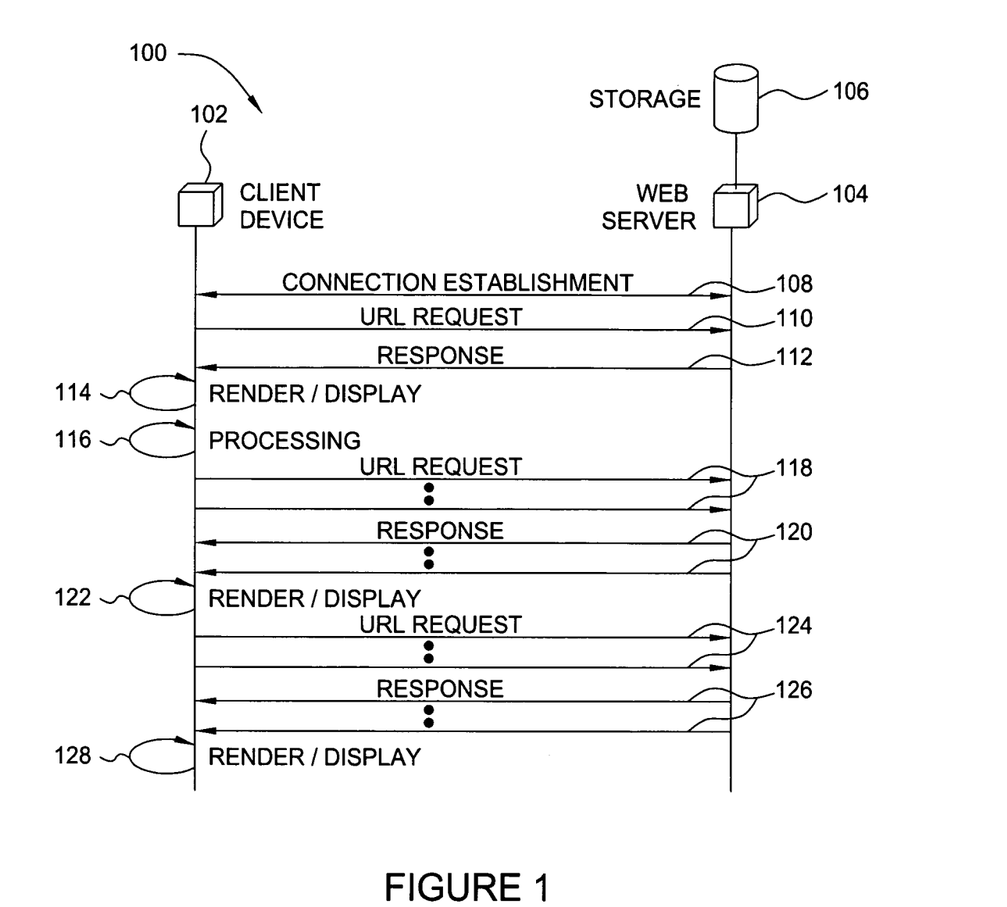
FIG. 1 illustrates a prior art, wireless network, client-web server data transaction sequence.

HTTP Transactions: The HTTP protocol is based on a client-server model. In an HTTP transaction, an HTTP client opens a connection and sends a URI (URL) request to an HTTP server; and then that server returns a response message, usually containing a resource that was requested. The HTTP client parses the response and requests embedded resources required to complete the transaction. After delivering the response, the client and server close the connection. FIG. 1 (described in more detail subsequently) depicts a prior art HTTP request-response transaction flow.

HTTP Response Format: both requests and responses are English-oriented, and both include:

an <initial line, different for request vs. response>;
Header 1: value1;
Header 2: value2;
Header 3: value3;
<Optional message body>

Initial Request Line: The initial line is different for the request than for the response. A request line has three parts, separated by spaces: a method name, path of the requested resource, and the version of HTTP being used. A typical request line looks like: GET /path/file.html HTTP/1.1 Host:

www.host1.com:80

Important HTTP Requests: GET, POST, and HEAD. A GET request asks the server to return the actual resource (i.e. message body); a HEAD request asks the server to return the response headers only, and not the actual resource (i.e. no message body), a POST request is used to send data to the server to be processed in some way, like by a CGI script. A POST differs from a GET request as follows: POST sends a block of data with the request (usually extra headers in the message body that describe the message, like Content-Type: and Content-Length); a POST request URI is not a resource to retrieve, it's usually a program to handle the data that is sent; and the HTTP response is normally program output, not a static file.

Path: a part of a URL (after the host name) that designates where the message is going.

Initial Response Line: a three part line in which the parts are separated by spaces, first, the HTTP version, second, a response status code that gives the result of the request, and third an English reason phrase describing the status code. Typical status lines are: HTTP/1.0 200 OK; or HTTP/1.0 404 Not Found.

Status Code: a computer-readable three-digit integer where the first digit identifies the general category of response.

Header Lines: information about the request, response, or about the object sent in the message body. The header lines are in the usual text header format, which is: one line per header, of the form Header-Name: value. HTTP 1.1 defines 46 headers, and one (Host: header) is required in requests. The following are some of the client and server headers:

The From: a header the supplies the email address of whoever's making the request, or running the program.

The User-Agent: a header that identifies the program that's making the request, in the form "Program-name/x.xx", where x.xx is the (mostly) alphanumeric version of the program. An implementation requirement that this invention proposes to the client browsers is to have an iHTTP tag in the User agent header. For example "User-agent: HTTP 1.1 iHTTP" would suggest that the browser is an iHTTP browser.

The Server: a header that is analogous to the User-Agent: a header that identifies the server software in the form "Program-name/x.xx". An implementation requirement that this invention proposes to the servers is to have an iHTTP tag in the Server header. For example "Server: Mozilla/3.0 Gold iHTTP" would suggest that the server is an iHTTP server.

The Last-Modified: a header that supplies the modification date of the resource that's being returned. It's used in caching and other bandwidth-saving activities.

The Message Body: an HTTP data message sent after the header lines. In a response, the message body carries the requested resource to the client (the most common use of the message body), or perhaps explanatory text if there's an error. In a request, the message body is where user-entered data or uploaded files are sent to the server. If an HTTP message includes a body, there are usually header lines in the message that describe the body. In particular:

The Content-Type: header gives the MIME-type of the data in the body, such as text/html or image/gif.

The Content-Length: header gives the number of bytes in the body.

HTTP 1.1 standards require that HTTP Clients comply with the following:
- include the Host: header with each request
- accept responses with chunked data
- either support persistent connections, or include the "Connection: close" header with each request
- handle the "100 Continue" response To comply with HTTP 1.1 standards, servers must comply with the following:
- require the Host: header from HTTP 1.1 clients;
- accept absolute URL's in a request;
- accept requests with chunked data;
- either support persistent connections, or include the "Connection: close" header with each response;
- use the "100 Continue" response appropriately;
- include the Date: header in each response;
- handle requests with If-Modified-Since: or If-Unmodified-Since: headers;
- support at least the GET and HEAD methods; and
- support HTTP 1.0 requests.

A number of prior art techniques are known to improve network performance. A client can "pipeline" requests i.e., send multiple requests, without waiting for each response. The server sends its responses to those requests in the same order that the requests were received. Clients retry their connection if the first pipelined attempt fails or resend their requests if the server closes the connection before sending all of the corresponding responses.

Pipelining requires a powerful feature of HTTP 1.1: a persistent connection between server and client. Prior to persistent connections, a separate TCP connection was established to fetch each URL, increasing the load on HTTP servers and causing congestion on the networks. The use of embedded images and other associated data often requires a client to make multiple requests to the same server in a short amount of time. Persistent HTTP connections have the following advantages:

By opening and closing fewer TCP connections, CPU time is saved, and memory used for TCP protocol control blocks is also saved.

HTTP requests and responses can be pipelined on a connection. Pipelining allows a client to make multiple requests without waiting for each response, allowing a single TCP connection to be used much more efficiently, with much lower elapsed time.

They decrease network congestion by reducing the number of packets generated due to "TCP:Open" requests and by allowing TCP sufficient time to determine the congestion state of the network.

HTTP can evolve more gracefully, since errors can be reported without the penalty of closing the TCP connection.

HTTP 1.1 accelerates the transmission of pages from server to the client by allowing server-side HTML compression so server applications such as Apache XX+ or IIS can compress the source code page before sending it out over the network. HTML compression improves the download size of pages by up to 300%.

Another way to improve performance is link prefetching. Link prefetching makes use of a browser's idle time by downloading files that aren't on the current page, but might be needed a page or two later. Link prefetching doesn't slow pages down since the extra downloads don't start until after the current page has finished loading and the browser has the time to download a prefetch link.

Yet another way to improve performance is Network (or Proxy) Caching. While a client browser can cache store commonly used images on the users' hard drives, it should be understood that similar caches can exist in other network locations. Network Caches make websites seem more responsive because information doesn't have to travel nearly as far to reach the user's computer. Even without a constantly updating site, there are images and other pieces of content, which don't change very often. That content could be downloaded much faster from a nearby network cache than it would from a far-off server.

Numerous other techniques exist. For example, there are several other techniques used to help improve faster response times: stopping scripts (javascripts) from loading until as late as possible. This improves performance because whenever a browser encounters a <script> tag, the HTML parser halts while the browser fetches the script from the network, parses it, and then executes it. Another approach is adding a short <head> to a web document to ensure that the initial chunks of data the user receives contains some "real" content that gets displayed immediately. That improves that system's "perceived speed."

While the foregoing improvements are effective on wired networks and can be used in conjunction with the embodiments of the present invention, as noted previously, wireless data networks have special problems with assigning SCHs and resource constrained thin client terminals. Embodiments of the present invention use an enhanced HTTP protocol that is referred to herein as an improved HTTP system (iHTTP). The iHTTP solution eliminates the need for the end-user client to parse the primary URI response and then send new URI requests for the embedded resources. This creates a shortened client-server request-response transaction when compared to the traditional HTTP transaction shown in FIG. 1. Avoiding subsequent URI requests can significantly improve performance (response time to the end-user) and efficiently using the SCH assignment for a short duration.

Another serious limitation of wireless networks/services is the limitations of terminals with thin client software. As most of the wireless end-user devices are thin client devices they are always resource constrained. For example the end-user terminal operating systems are thin Operating Systems, without sophisticated multitasking capabilities and hence do not contain mechanisms to handle simultaneous transmit/receive transactions, which is a standard feature in traditional broadband networks. In traditional broadband networks, the request-response transactions are efficiently handled by end-user terminal client-server multi-tasking capabilities. Also because of resource limitations on end-user terminals, parsing and rendering of received information takes more time compared to the processing and rendering on laptops.

FIG. 1 illustrates a typical prior art wireless internet connection network 100 which is comprised of a client device 102, typically a device such as a laptop computer or a wireless handset, that connects to a web server 104 having storage 106. The initial connection 108 is started by the client device 102 and the web server 104 initiating communications. That is a bidirectional handshake process. Then, when the client device 102 wishes to receive an HTTP resource, it issues a URL request 110 to the web server 104. The web server 104 searches the Internet to obtain a response to the specific URL request 110. That response 112 is then sent back to the client device 102.

After receiving the response, the client device 102 then renders and/or displays 114 the response, and then processes that response 116. After processing the initial response to identify embedded resources, the client device 102 issues multiple URL requests 118, in list form, to the web server to obtain the embedded resources. The top URL request has first priority; the second URL request has second priority, etc. The web server receives the URL requests 118, parses them, and obtains the requested information. Subsequently, as the responses come in, the web server 104 sends responses 120 back to the client device 102, which then renders 122 the response and performs actions in accord with the responses 120. The process continues with multiple URL requests 124 and multiple responses 126 and renderings 128.

Figure 2:
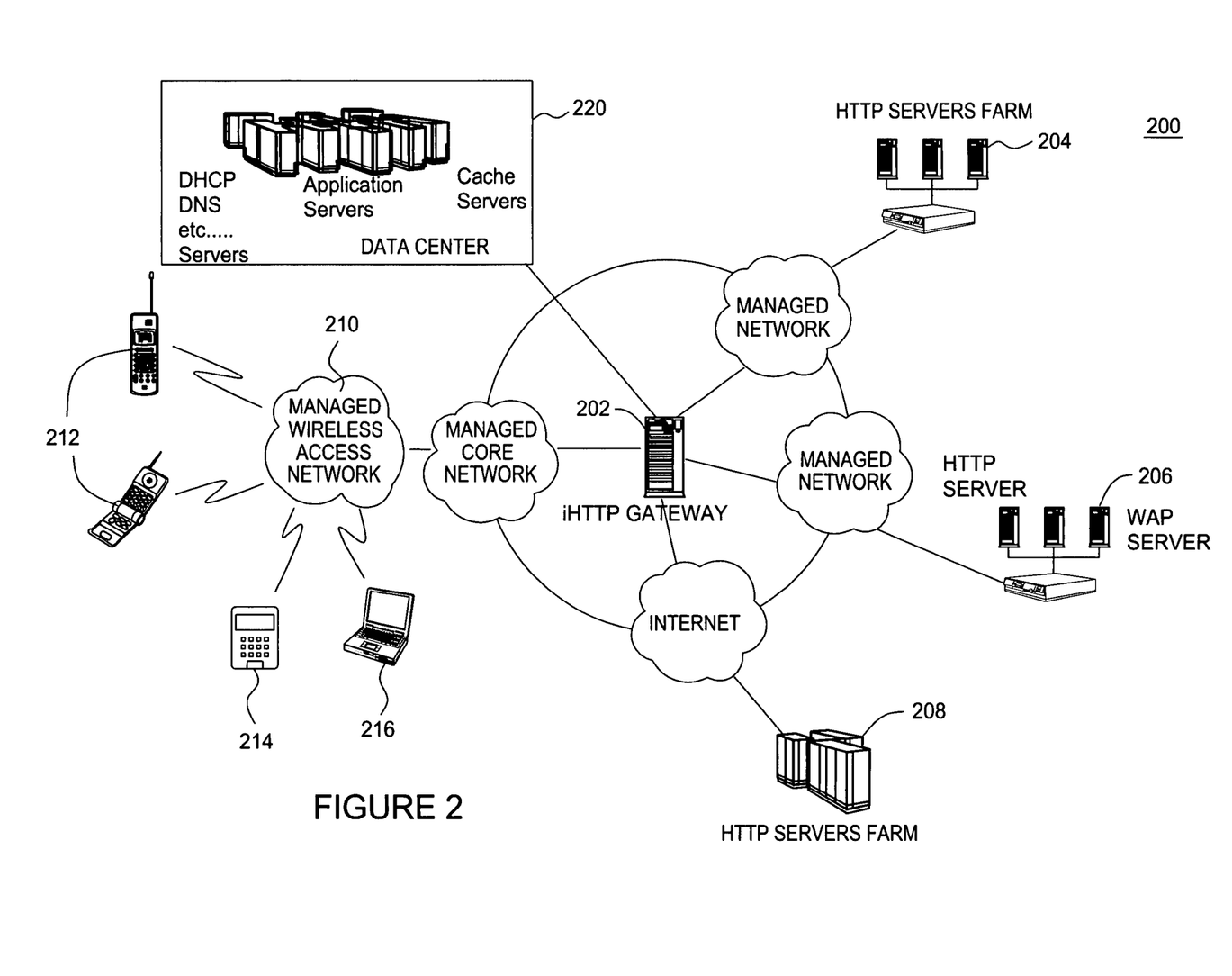
FIG. 2 illustrates an embodiment of a communication architecture that is in accord with the principles of the present invention.

The process illustrated in FIG. 1 has proven too slow for wireless networks, especially with thin client devices. Therefore, the principles of the present invention provide for a new, faster wireless architecture that saves time via an iHTTP process. FIG. 2 illustrates an embodiment that implements those principles, an iHTTP solution architecture 200. That architecture includes an iHTTP gateway 202 that communicates with the Internet via standard HTTP server farms 204, 206, and 208. This is important since no changes to existing HTTP servers are required. The iHTTP gateway 202 provides data services over a wireless access network 210. That network can provide data communications to any number of devices, such as data enabled handheld phones 212, PDA 214 or a computer such as a laptop computer 216. To provide end-to-end explanation of data transactions on wireless networks, the iHTTP gateway 202 is shown with a data center 220, which includes various memory devices, DHCP/DNS servers, application servers, backup support, software programs, and any other resource that enables the iHTTP gateway 202 to perform its functions.

For most of the HTML content within the control of the iHTTP network administrators, the index files could be pre-compiled and stored in the iHTTP gateway. For HTML content not within their control, the index files are created as the HTML request is handled. Once the index files are created they are subsequently used to obtain embedded resources. The first method works better for static resources, while the second seems better for dynamically changing resources.

In operation, once a device, say the laptop computer 216, enters the wireless access network 210, that device can communicate with the iHTTP gateway 202. Based on processes described subsequently, data is transferred between the laptop computer 216 and the iHTTP gateway 202.

When the laptop computer 216 sends a request for URL information to the iHTTP gateway 202, the iHTTP gateway 202 searches its database to retrieve the pre-compiled index file created for the URL. The result of the search could be one of the following: index file is found of the URL request or the index file does not exist.

If the iHTTP gateway finds the index file in its database, then the iHTTP first looks for the URL response and the embedded resources in the network cache. Once all of the data is received, the iHTTP gateway 202 creates a file that contains the original URL response and embedded resources. That file is then sent to the laptop computer 216 by the wireless access network 210.

If the iHTTP gateway cannot find the URL response in the network cache, then iHTTP gateway starts processing the index file for the embedded resources, which are listed in order of the time required to obtain each embedded resource (see below), and then sends a sequence of requests to obtain the embedded resources in the URL response in the listed order. Once all of the embedded resource responses are received, the iHTTP gateway 202 creates a file that contains the original URL response and the-now-available embedded resources. That file is then sent to the laptop computer 216 by the wireless access network 210.

If the iHTTP gateway cannot find an index file for the URL request, then the iHTTP gateway 202 passes that request along one or more of the HTTP server farms 204, 206, and 208 to obtain the requested information. Once a response to the original URL request is received, the iHTTP gateway 202 parses out for any embedded resources in the response, lists them in order of the time required to obtain each embedded resource (see below), and then sends a sequence of requests to obtain the embedded resources in the URL response in the listed order. Once all of the embedded resource responses are received, the iHTTP gateway 202 creates a file that contains the original URL response and the-now-available embedded resources. That file is then sent to the laptop computer 216 by the wireless access network 210.

The iHTTP gateway can support features like data acceleration to optimize resource transmission on the wireless access. The data acceleration could include compression, trans-coding of data and caching data to minimize the amount of data sent over the wireless link, and optimizing (or replacing) the TCP transport protocol to operate more efficiently in the face of the challenges of a wireless environment. The data acceleration features would be able to dynamically determine the type of client device, or at the very least, the nature of the data, then format the resources and embedded resources appropriately for optimal delivery to the client device.

This process of compiling of the URL response into a single file significantly reduces the number of supplementary channel (SCH) assignment requests & assignments, that the wireless network base-station would have to assign to the laptop computer 216 if that computer had parsed the original URL response itself and then took action to obtain the embedded resources.

Figure 3:
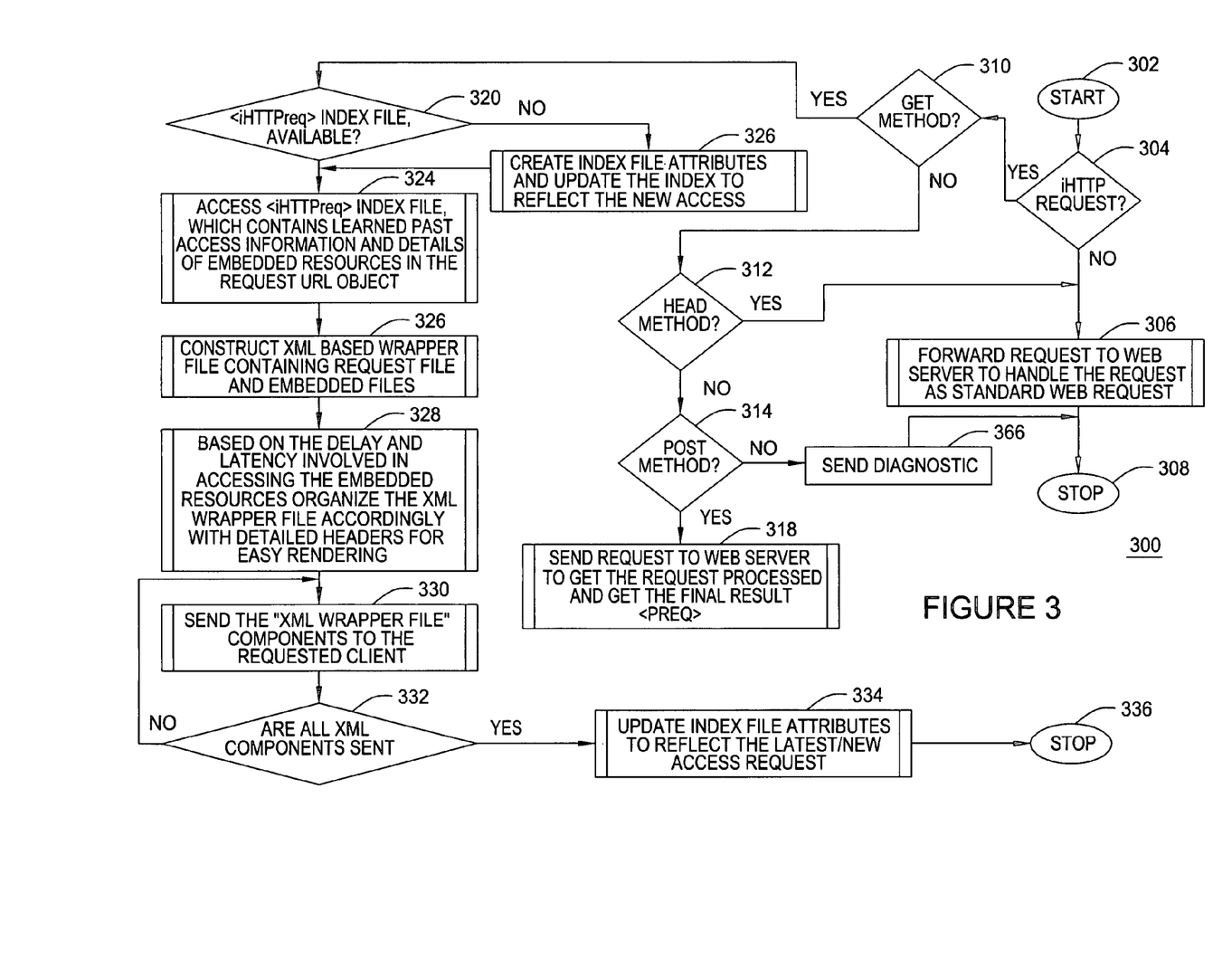
FIG. 3 illustrates a flow diagram of a method of an iHTTP gateway processing transactions and that is in accord with the principles of the present invention.

FIG. 3 illustrates a general process of operating the network 200. The process 300 begins at step 302 by the iHTTP gateway 202 receiving a URL information request from a user. At step 304 an inquiry is made as to whether an iHTTP request has been received. An iHTTP is one that would return embedded resources. If the answer is no, at step 306, the received URL request is forwarded to the web server to handle the request as a standard web request (the steps of which are not shown in the flowchart), and then the process stops at step 308. However, if at step 304 an iHTTP request was found to have been made, at step 310 an inquiry is made as to whether that request is a GET method. If the answer is no, the process proceeds to step 312, where an inquiry is made as to whether it was a HEAD method. If the answer is yes, then a jump is made to step 306 to forward the request to the web server to handle the request as a standard web request, and the process stops at step 308.

However, if at step 312, the answer is that it was not a HEAD method, then an inquiry is made as to whether it was a POST method. If the answer at step 312 is no, a diagnostic is sent at step 316 and the process 300 stops at step 308. However, if at step 314 the answer is that the request is a POST method, at step 318 a request is sent to the web server to obtain the results.

Turning back to step 310, if at step 310 a GET method was found, the process 300 proceeds to step 320 where an iHTTP request index file availability inquiry is made. A request index file, typically part of a meta-file, represents learned past access information and details for the URL address. Thus, a request index file contains prior access times to obtain a particular URL request from a URL address and embedded resources that were at the particular URL address. Many URL addresses, for example, the New York Times web site, are contacted repeatedly by the user or by other users. By logging prior access time information and embedded resources for a particular bit of URL address, the iHTTP gateway 202 can estimate just how long it will take to obtain that URL information and its embedded resources. If the request index file exists, it may be available to the iHTTP gateway 202 either directly, if stored internally, or indirectly via the data center 220 (see FIG. 2). If the iHTTP request index file is not available, at step 322 a request index file is created. That new file is provided with a set of initial functional attributes such as an initially assumed access time. Additionally, at step 322 the new request index file is added to an index listing (meta-file) to enable future access.

If at step 320 an iHTTP request index file is available, or upon completion of step 322, the process 300 proceeds to step 324 to access the iHTTP request index file and to obtain learned past access information. That learned past information may include a listing of embedded resources and requested URL objects. Based on that information, at step 326 an XML based wrapper file containing the requested files and embedded files is constructed. Then, at step 328, based on the delays and latencies involved in accessing the resources in the XML based wrapper file, which are available from the request index files (which, in turn can be found from the meta-file) the resources (including detailed headers for easy rendering) in the XML wrapper file are sorted by access times, longest first.

At step 330, the resources of the XML wrapper file are sequentially sent to the HTTP server farms 204, 206, and 208. As the responses are received they are sent to the requesting client. A step 332 an inquiry is made as to whether all of the XML components have been sent to the requesting client. If the answer is no, a return is made to step 330 to continue receiving and sending XML wrapper file resources. However, if at step 332 all of the XML components have been sent, the process 300 proceeds to step 334 where the iHTTP request index file attributes are updated to reflect the latest access request. Process 300 then stops at step 336.

Unlike standard HTTP transactions, the iHTTP server does not wait for requests for embedded files from the client. Rather, by using the resource index file the iHTTP server constructs a URI response file with all of the embedded resources, and then sends that file to the client. The URI response file also contains details about its structure to enable easy rendering by the user.

Figure 4:
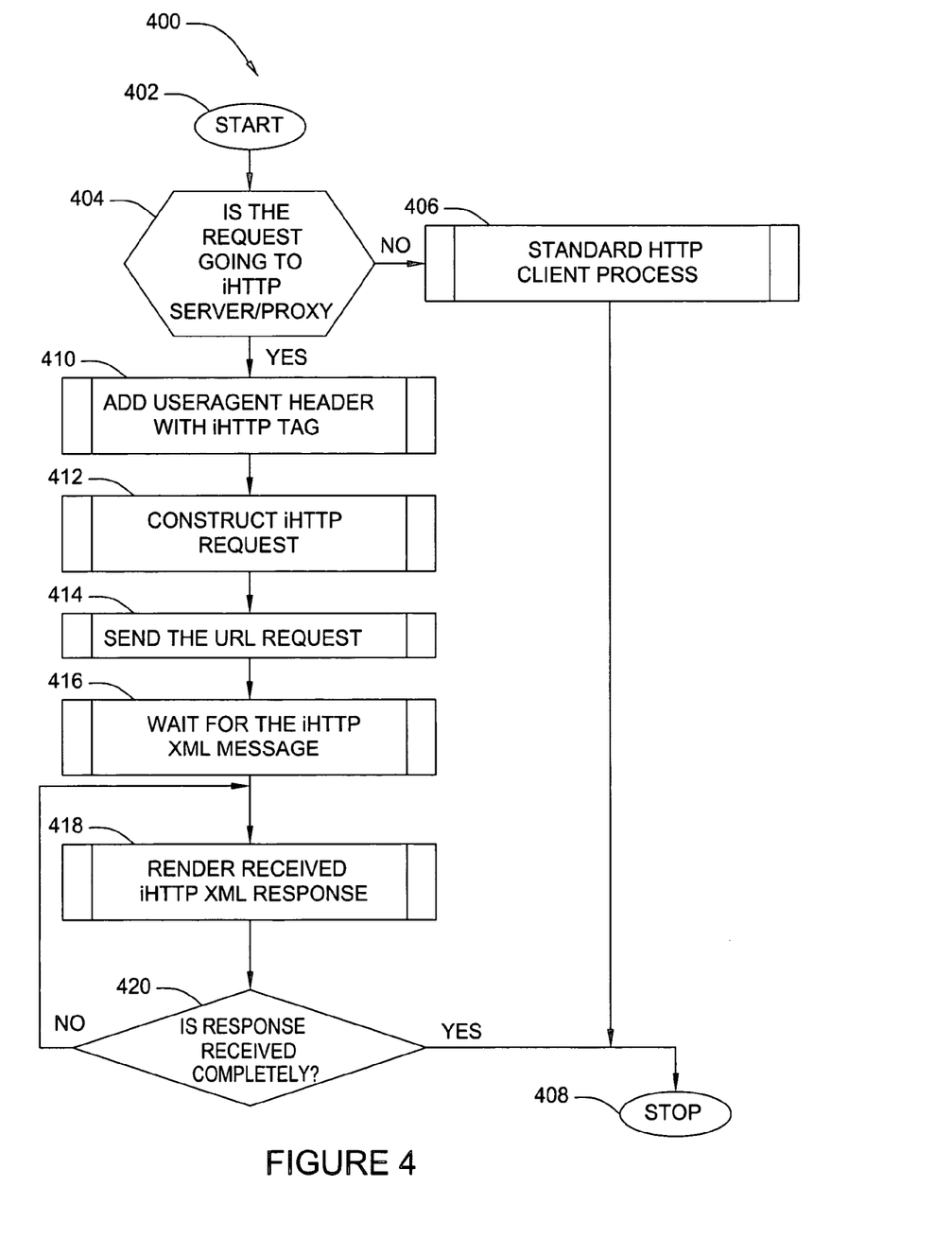
FIG. 4 illustrates a flow diagram of a method of an end-user processing iHTTP requests with an iHTTP gateway.

FIG. 4 illustrates a process 400 of how a user (such as a laptop 216) interacts with the iHTTP gateway 202. The process starts at step 402 by the laptop 216 initiating communications via the wireless access network 210. Then, at step 404 the laptop 216 makes an inquiry as to whether it is communicating with an iHTTP server 202. If the answer is no, at step 406, the laptop 216 sends standard HTTP data. After transactions illustrated in FIG. 1 are completed, the process 400 stops at step 408.

However, if at step 404, the laptop 216 determines that it is communicating with an iHTTP server 202, at step 410 the laptop 216 knows to add a UserAgent header with iHTTP tags. Then, at step 412 the user constructs an iHTTP request. At step 414 that request is sent as a URL request to the iHTTP gateway 202. At step 416 the laptop 216 then waits for an iHTTP XML method from the iHTTP gateway 202. At step 418, when that XML message is received, the laptop 216 renders the received iHTTP XML response to access requested information. At step 420, an inquiry is made as to whether the response has been completely received. If the answer is no, a loop is made back to step 418 and the laptop 216 continues to render the iHTTP XML response message.

However, if at step 420 it is determined that the complete response has been received, the process proceeds to step 408 and process 400 stops.

While the foregoing has described maintaining pre-compiled resource index files for the embedded resources and constructing an xml based response file, the iHTTP gateway 202 could actually store pre-compiled xml based response files. Once the iHTTP gateway 202 constructs a file, it does not have to reconstruct that file as long as it is stored and the contents of the stored file do not get obsolete.

While the foregoing is directed to embodiments of the present invention, other and further embodiments of the invention may be devised without departing from the basic scope thereof, and the scope thereof is determined by the claims that follow.

The invention claimed is:

1. An apparatus for use in a communication network, comprising:
a processor and a memory communicatively connected to the processor, the processor configured to:
receive a request for a resource having embedded data;
obtain the resource and the embedded data using a resource index file having information regarding the resource and the embedded data, wherein the resource index file includes a link listing comprising a plurality of links to the embedded data, wherein the links to the embedded data specify locations of respective portions of the embedded data, wherein the link listing is arranged in an order of estimated lengths of time to obtain the respective portions of the embedded data from the locations specified by the links to the embedded data, wherein the estimated lengths of time to obtain the respective portions of the embedded data are determined based on prior access time information comprising prior access times to obtain the respective portions of the embedded data from the locations specified by the links to the embedded data;
bundle the resource and the embedded data into a response file; and
send the response file.

2. The apparatus of claim 1, wherein the request comprises a uniform resource identifier.

3. The apparatus of claim 2, wherein the request is received from a wireless access network.

4. The apparatus of claim 3, wherein the request is from a client device.

5. The apparatus of claim 1, wherein the processor is configured to update the resource index file based on obtaining of the embedded data.

6. The apparatus of claim 1, wherein, for obtaining the embedded data, the processor is configured to:
send a plurality of uniform resource location requests for the embedded data using the links of the resource index file; and
receive the embedded data.

7. The apparatus of claim 6, wherein the processor is configured to send the uniform resource location requests for the embedded data using the links of the resource index file based on the order of estimated lengths of time to obtain the embedded data.

8. The apparatus of claim 1, wherein the processor is configured to perform at least one of data acceleration, compression, trans-coding, and application-based optimization on the resource and the embedded data.

9. An apparatus for use in a communication network, comprising:
a processor and a memory communicatively connected to the processor, the processor configured to:
receive a request for a resource having embedded data;
obtain the resource and the embedded data using a resource index file having information regarding the resource and the embedded data, wherein the resource index file includes a link listing comprising a plurality of links to the embedded data, wherein the links to the embedded data specify locations of respective portions of the embedded data, wherein the link listing is arranged in an order of estimated lengths of time to obtain the respective portions of the embedded data from the locations specified by the links to the embedded data, wherein the estimated lengths of time to obtain the respective ortions of the embedded data are determined based on prior access time information comprising prior access times to obtain the respective portions of the embedded data from the locations specified by the links to the embedded data; and
update the resource index file based on obtaining of the embedded data using the resource index file.

10. The apparatus of claim 9, wherein the request is received from a client device, wherein the processor is further configured to:
bundle the resource and the embedded data into a response file; and
send the response file toward the client device.

11. The apparatus of claim 9, wherein the processor is further configured to:
send a plurality of uniform resource location requests for the embedded data using the links of the resource index file; and
receive the embedded data.

12. The apparatus of claim 11, wherein the processor is configured to send the uniform resource location requests for the embedded data using the links of the resource index file based on the order of predetermined estimated lengths of time to obtain the embedded data.

13. A method, comprising:
using a processor and a memory for:
receiving a request for a resource having embedded data;
obtaining the resource and embedded data using a resource index file having information regarding the resource and the embedded data, wherein the resource index file includes a link listing comprising a plurality of links to the embedded data, wherein the links to the embedded data specify locations of respective portions of the embedded data, wherein the link listing is arranged in an order of estimated lengths of time to obtain the respective portions of the embedded data from the locations specified by the links to the embedded data, wherein the estimated lengths of time to obtain the respective portions of the embedded data are determined based on prior access time information comprising prior access times to obtain the respective portions of the embedded data from the locations specified by the links to the embedded data;
bundling the resource and the embedded data into a response file; and
sending the response file.

14. The method of claim 13, wherein the request is received and the response file is sent over a wireless access network.

15. The method of claim 13, wherein obtaining the resource and embedded data using the resource index file comprises:
sending a plurality of uniform resource location requests for the embedded data using the links of the resource index file; and
receiving the embedded data.

16. The method of claim 15, wherein sending the uniform resource location requests for the embedded data using the links of the resource index file is performed based on the order of estimated lengths of time to obtain the embedded data.

* * * * *